United States Patent [19]

Krippl et al.

[11] Patent Number: 4,948,815
[45] Date of Patent: Aug. 14, 1990

[54] PROCESS FOR CHARGING AT LEAST ONE COMPONENT WITH GAS IN THE PREPARATION OF CELLULAR PLASTICS

[75] Inventors: Kurt Krippl, Monheim; Klaus Schulte, Leverkusen, both of Fed. Rep. of Germany

[73] Assignee: Bayer Aktiengesellschaft, Leverkusen, Fed. Rep. of Germany

[21] Appl. No.: 463,760

[22] Filed: Jan. 12, 1990

[30] Foreign Application Priority Data

Jan. 19, 1989 [DE] Fed. Rep. of Germany ....... 3901462

[51] Int. Cl.$^5$ ............................................... C08J 9/00
[52] U.S. Cl. ...................................... 521/50; 521/133; 521/155
[58] Field of Search .................... 521/50, 133, 155

[56] References Cited

U.S. PATENT DOCUMENTS

| | | | |
|---|---|---|---|
| 4,132,838 | 1/1979 | Kreuer et al. | 521/50 |
| 4,452,917 | 6/1984 | Proksa et al. | 521/50 |
| 4,764,536 | 8/1988 | Proksa et al. | 521/50 |
| 4,791,142 | 12/1988 | Pleuse et al. | 521/50 |

*Primary Examiner*—Morton Foelak
*Attorney, Agent, or Firm*—Joseph C. Gil

[57] ABSTRACT

The present invention is directed to a process for charging a component with a gas. The gas is metered through a hollow stirrer into the component to be charged with gas. The stirrer is operated at a higher gas throughput capacity than the amount of gas metered.

1 Claim, 1 Drawing Sheet

PROCESS FOR CHARGING AT LEAST ONE COMPONENT WITH GAS IN THE PREPARATION OF CELLULAR PLASTICS

BACKGROUND OF THE INVENTION

The present invention relates to a process for charging at least one free-flowing component with gas in the preparation of cellular plastics from at least two free-flowing reaction components. The gas is metered into a hollow stirrer from the outside, sucked in by it and is dispersed into the component in a gassing chamber.

In order to achieve certain properties in such plastics, it is necessary to charge at least one component with gas, for example air. The quality of the properties desired in the end product very largely depends on the dispersion and homogenization of the gas in the component. Such processes are used in particular in the preparation of preferably foamed polyurethane plastics, polyisocyanurate plastics and polyurea plastics. Dispersion of the gas into the component in a gassing tank provided with a hollow stirrer, with the gassing tank being intermediately positioned in a line leading from the storage tank to the mix head, is known from German Offenlegungsschrift No. 3,434,443. The stirrer blades of the hollow stirrer and/or the stirrer speed thereof are adjustable, so that a desired amount of gas per unit time can be sucked in. Other gassing processes with hollow stirrers are known and are described in published European application Nos. 110,244 and 175,252, and in German Offenlegungsschrift No. 3,434,444.

All the above processes have the deficiency that the dispersion and homogenization of the gas in the component is not adequate, which manifests itself in particular in the gassing of highly viscous components and with sparingly soluble gases.

An object of the present invention was to improve the processes of the above-mentioned type to the extent that the degree of dispersion of the gas in the component and the rate of solution are increased. At the same time, it was an object to allow the the devices of the above type to be used successfully for components of relatively high viscosity.

BRIEF DESCRIPTION OF THE DRAWING

The drawing illustrates an apparatus for performing the process of the present invention.

DESCRIPTION OF THE INVENTION

Figure 1:
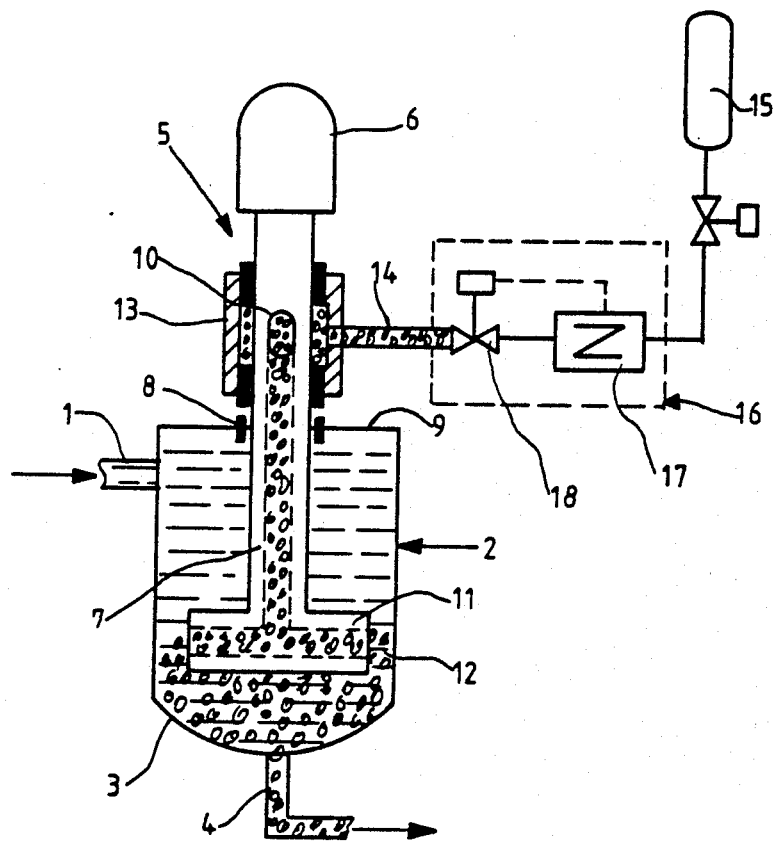

The above objects are achieved by operating the hollow stirrer at a higher gas throughput capacity (standard liter per minute) than that corresponding to the amount of gas (standard liter per minute) available to it. In this way, a relatively high pressure difference (reduced pressure) is achieved at the hollow stirrer, which means that the gas is taken up faster and more homogeneously by the component. A higher solubility is thereby effected. As a rule, a constant higher speed of rotation is set in comparison with the known processes in order to achieve the higher gas throughput capacity.

The same effect would be achieved by a corresponding change in the position or length of the stirrer blades, but this would be more expensive industrially.

A device for carrying out the new process is shown schematically in section in the drawing and will be explained in more detail below.

Polyol (as the component to be charged with gas) is introduced from a storage tank, not shown, via a line 1 into the upper region of a closed gassing tank 2. A line 4 leads from the bottom 3 of the gassing tank to a mix head, not shown. In the mixhead, the polyol charged with gas is mixed with isocyanate as a further component. After the mixture has left the mix head, polyurethane foam is formed from it. The stirrer unit 5 consists of a drive motor 6 of adjustable speed of rotation and a hollow stirrer 7, which is passed through the tank lid 9 by means of a seal 8. Outside the stirrer tank 2, the hollow stirrer 7 has a suction opening 10, which is connected to openings 12 provided at the ends of the stirrer arms 11. In the region of the suction opening 10, the hollow stirrer 7 is surrounded by a housing 13 in which a gas feed line 14 merges. The gas feed line is connected to a gas source 15. A gas metering unit 16 which consists of a gas flow meter 17 and a gas flow regulating valve 18 is positioned in the line 14. Both the polyol and the gas are fed continuously in a constant flow and the mixture is removed. The stirrer 5 operates at a constant speed of rotation, which is adjusted so that a higher gas throughput capacity than that corresponding to the amount of gas available from the gas metering unit 16 is achieved.

In one example of use, the gassing tank 2 has a volume of 2 liters. It is under an operating pressure of 3 bar. The hollow stirrer 7 operates at 3,000 rpm, which corresponds to a suction capacity of 10 standard 1/1 min. However, the amount of gas available from the gas metering unit 16, in this case air, is only 5 standard 1/min. In this way, a suction effect (pressure difference) of 0.4 bar is generated. 6 1/min polyol are fed in. The mean residence time of the polyol in the stirrer tank 2 is 20 sec. The gassed polyol has a bubble content of 27/cm$^2$ at an average bubble size of 0.9 mm.

(It is usual to determine the number of bubbles per square centimeter. The gassed component is introduced into a transparent vessel and the bubbles, present within a defined area of the vessel wall, are counted.)

What is claimed is:

1. In a process for the preparation of cellular plastic from at least two free-flowing reaction components comprising charging at least one of said free-flowing components with gas, wherein the gas is metered into a hollow stirrer from the outside, is sucked through the stirrer and is dispersed into the component in a gassing chamber, mixing the component so charged with the other free flowing components, and allowing said cellular plastic to form, the improvement wherein the hollow stirrer is operated at a higher gas throughput capacity (standard liter per minute) than that corresponding to the amount of gas (standard liter per minute) available to it.

* * * * *